United States Patent
Navale et al.

(10) Patent No.: US 8,243,085 B2
(45) Date of Patent: Aug. 14, 2012

(54) BOOSTING GRAPHICS PERFORMANCE BASED ON EXECUTING WORKLOAD

(75) Inventors: Aditya Navale, Folsom, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 11/967,207

(22) Filed: Dec. 30, 2007

(65) Prior Publication Data

US 2009/0167770 A1    Jul. 2, 2009

(51) Int. Cl.
*G06F 13/14* (2006.01)

(52) U.S. Cl. ........ 345/519; 345/419; 345/501; 345/502; 345/522; 713/322; 713/340; 713/501

(58) Field of Classification Search .................. 345/501, 345/519; 700/50; 713/504; 703/340
See application file for complete search history.

(56) References Cited

U.S. PATENT DOCUMENTS

| | | | | |
|---|---|---|---|---|
| 6,216,235 B1 * | 4/2001 | Thomas et al. | ................ | 713/501 |
| 6,275,945 B1 * | 8/2001 | Tsuji et al. | ..................... | 713/300 |
| 6,657,634 B1 * | 12/2003 | Sinclair et al. | ................ | 345/534 |
| 6,715,089 B2 * | 3/2004 | Zdravkovic | ..................... | 713/322 |
| 6,718,475 B2 * | 4/2004 | Cai | ............................ | 713/323 |
| 6,785,829 B1 * | 8/2004 | George et al. | ................. | 713/320 |
| 6,820,209 B1 * | 11/2004 | Culbert et al. | ................ | 713/501 |
| 6,971,034 B2 * | 11/2005 | Samson et al. | ................ | 713/300 |
| 6,983,384 B2 * | 1/2006 | Iwaki | ........................... | 713/300 |
| 7,451,332 B2 * | 11/2008 | Culbert et al. | ................ | 713/320 |
| 7,882,369 B1 * | 2/2011 | Kelleher et al. | ............... | 713/300 |
| 2003/0158982 A1 * | 8/2003 | Sadowsky et al. | .......... | 710/107 |
| 2003/0210247 A1 * | 11/2003 | Cui et al. | ....................... | 345/534 |
| 2005/0049729 A1 * | 3/2005 | Culbert et al. | ................. | 700/50 |
| 2005/0223249 A1 * | 10/2005 | Samson | ....................... | 713/320 |
| 2007/0156998 A1 * | 7/2007 | Gorobets | ...................... | 711/170 |
| 2009/0121729 A1 * | 5/2009 | Farkas | ........................... | 324/713 |

* cited by examiner

*Primary Examiner* — James A Thompson
*Assistant Examiner* — Abderrahim Merouan
(74) *Attorney, Agent, or Firm* — Carrie A. Boone, P.C.

(57) ABSTRACT

A novel graphics system including workload detection software is disclosed. The novel graphics system increases the voltage and frequency of the graphics hardware in an integrated graphics chipset, depending on operations performed by the hardware, for either a performance advantage or a power savings advantage.

8 Claims, 4 Drawing Sheets

BOOSTING GRAPHICS PERFORMANCE BASED ON EXECUTING WORKLOAD

BACKGROUND

Technical Field

This application relates to graphics hardware and, more particularly, to graphics hardware performance issues.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel graphics system including workload detection software are disclosed. The novel graphics system increases the voltage and frequency of the graphics hardware in an integrated graphics chipset, based on the workload of the graphics hardware, for either a performance advantage or a power savings advantage.

Figure 1:
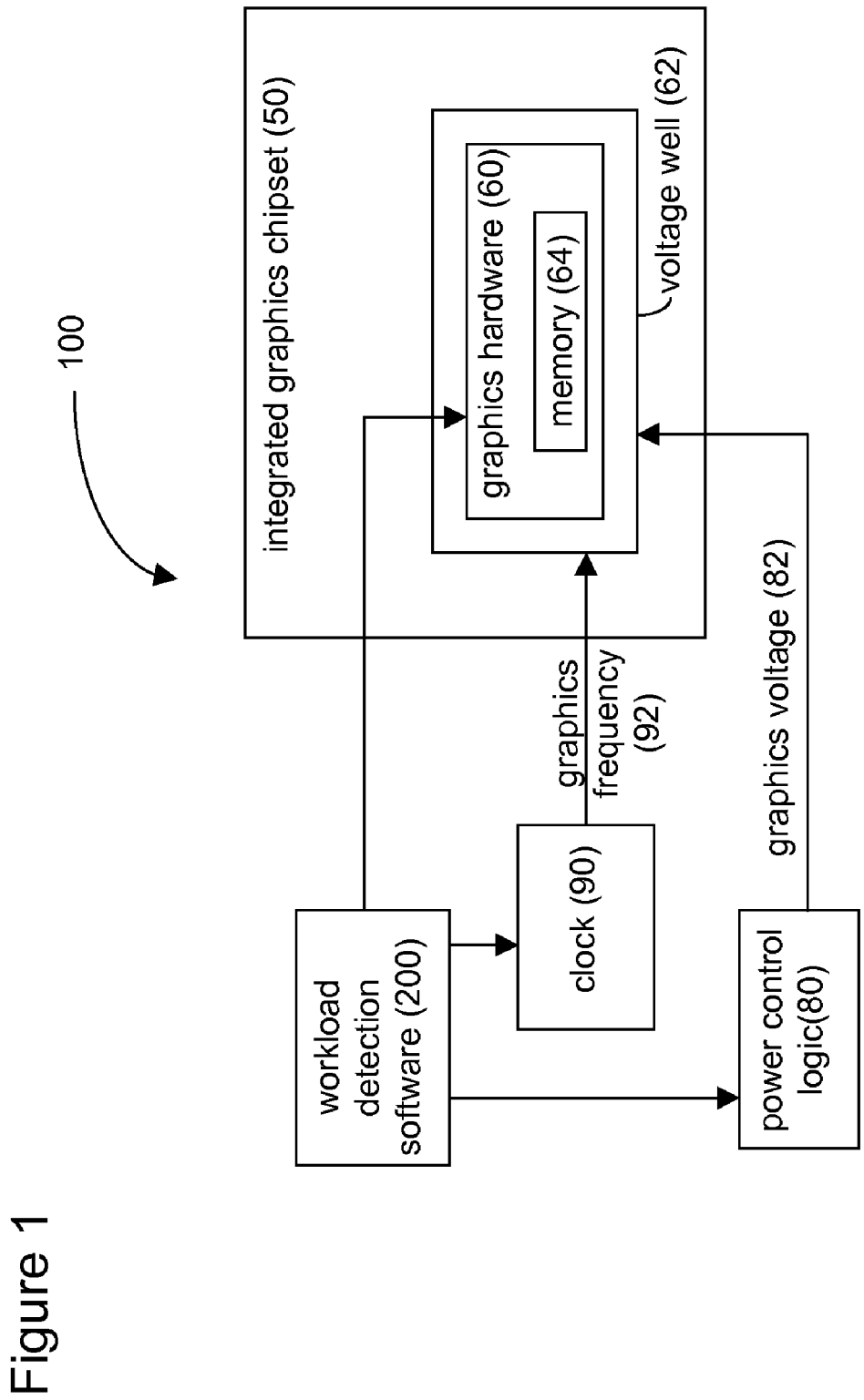
FIG. 1 is a block diagram of a graphics system, including workload detection software, according to some embodiments.

A graphics system 100 is depicted in FIG. 1, according to some embodiments. The graphics system 100 includes an integrated graphics chipset 50, including graphics hardware 60. For simplicity, other components of the graphics system 100 are not included in the illustration. The graphics system 100 further includes workload detection software 200, which identifies a predetermined context in which the graphics hardware 60 may benefit from a performance boost in the form of an increase in voltage and an increase in processing speed. Accordingly, the workload detection software 200 is coupled to both power control logic 80, which supplies a graphics voltage 82 to the graphics hardware 60, and a clock 90, which supplies one or more clocks 92 to the graphics hardware 60.

Within the integrated graphics chipset 50, the graphics hardware 60 is in a separate voltage well 62 from other logic in the chipset. This enables the voltage of the graphics hardware 60 to be adjusted separately from other components in the graphics chipset 50. Further, the one or more clocks 90 are dedicated to supplying one or more frequencies 92 to the graphics hardware 60.

In some embodiments, the graphics system 100 is capable of boosting the voltage and frequency of the graphics hardware 60 in the integrated graphics chipset 50, with the help of the workload detection software 200. The workload detection software 200 is able to identify the workload being submitted to the graphics hardware 60. In some embodiments, the workload is communicated based on a current context executing the graphics hardware 60.

If the submitted workload does not have the ability to hit a thermal design power (TDP) for the graphics hardware 60, the graphics voltage 82 and the graphics frequency 92 can be increased, for better performance.

The hardware media decode workload is a case in point. The media decode engine is a portion of the three-dimensional (3D) pipeline of the graphics hardware 50 (not shown). However, not all the components of the 3D pipeline are used for the media decode. Hence, it is not possible to hit the worst case TDP for the media workload. Thus, the voltage and frequency for the media workload can be increased. Other engines of the graphics hardware 50 can similarly benefit. The workload detection software 200 identifies the possible workloads in the graphics hardware 50 that could benefit from a boost (increase) in voltage and clock frequency.

In some embodiments, there are two advantages to boosting the voltage and frequency of the graphics hardware 60: cases where the processing power of the media engine is not sufficient to support all the requirements of the high-definition decode may benefit; and cases where the submitted workload can be completed early, such that the power plane for the graphics hardware may be turned off. Thus, in some embodiments, modifying the voltage and frequency of the graphics hardware 60 leads to either an increase in performance or a power savings advantage.

As indicated in FIG. 1, the graphics hardware 60 is in a separate voltage well 62 from the rest of the integrated graphics chipset 50. Thus, the voltage 82 of the graphics hardware 60 may be controlled independent of other portions of the integrated graphics chipset 50. In some embodiments, the workload detection software 200 controls the graphics voltage 82 based on the type of workload running on the graphics hardware 60. The current workload on the graphics hardware is identified by the context that is running on the system. A context is a collection of states, which are managed by the graphics hardware 60. The workload detection software 200 introduces different locations of memory to identify the context for the graphics hardware 60.

Figure 2:
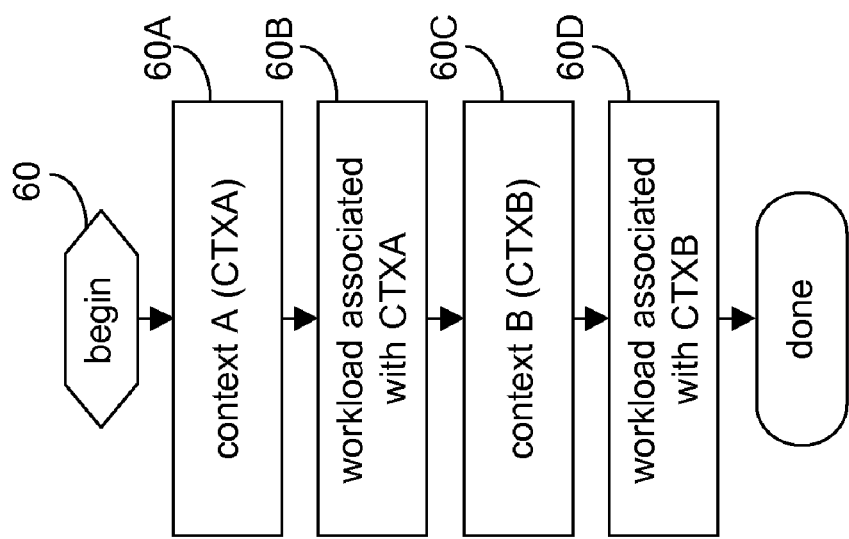
FIG. 2 is a flow diagram showing how the graphics hardware executes commands in the graphics system of FIG. 1, according to some embodiments.

The sequence of commands executed in the graphics hardware 60 is depicted in FIG. 2, according to some embodiments, for two contexts, A and B. First, the graphics hardware 60 executes context A (CTXA) (block 60A). Then, the graphics hardware 60 executes the workload associated with CTXA (block 60B). Next, the graphics hardware 60 executes context B (CTXB) (block 60C). Finally, the graphics hardware 60 executes the workload associated with CTXB (block 60D).

In some embodiments, the graphics system 100 optionally enables context state switches to be managed by hardware rather than by software. Thus, the graphics hardware 60 manages the switch from context A to context B. In some embodiments, the graphics hardware 60 includes a memory 64, inside which all states associated with CTXA are saved when the hardware 60 switches to context B (blocks 60C and 60D). In other embodiments, an external memory is used to store CTXA states prior to the switch to CTXB.

The workload detection software 200 identifies the context that can afford the performance boost by setting a bit in a hardware command used to set the context.

Figure 3:
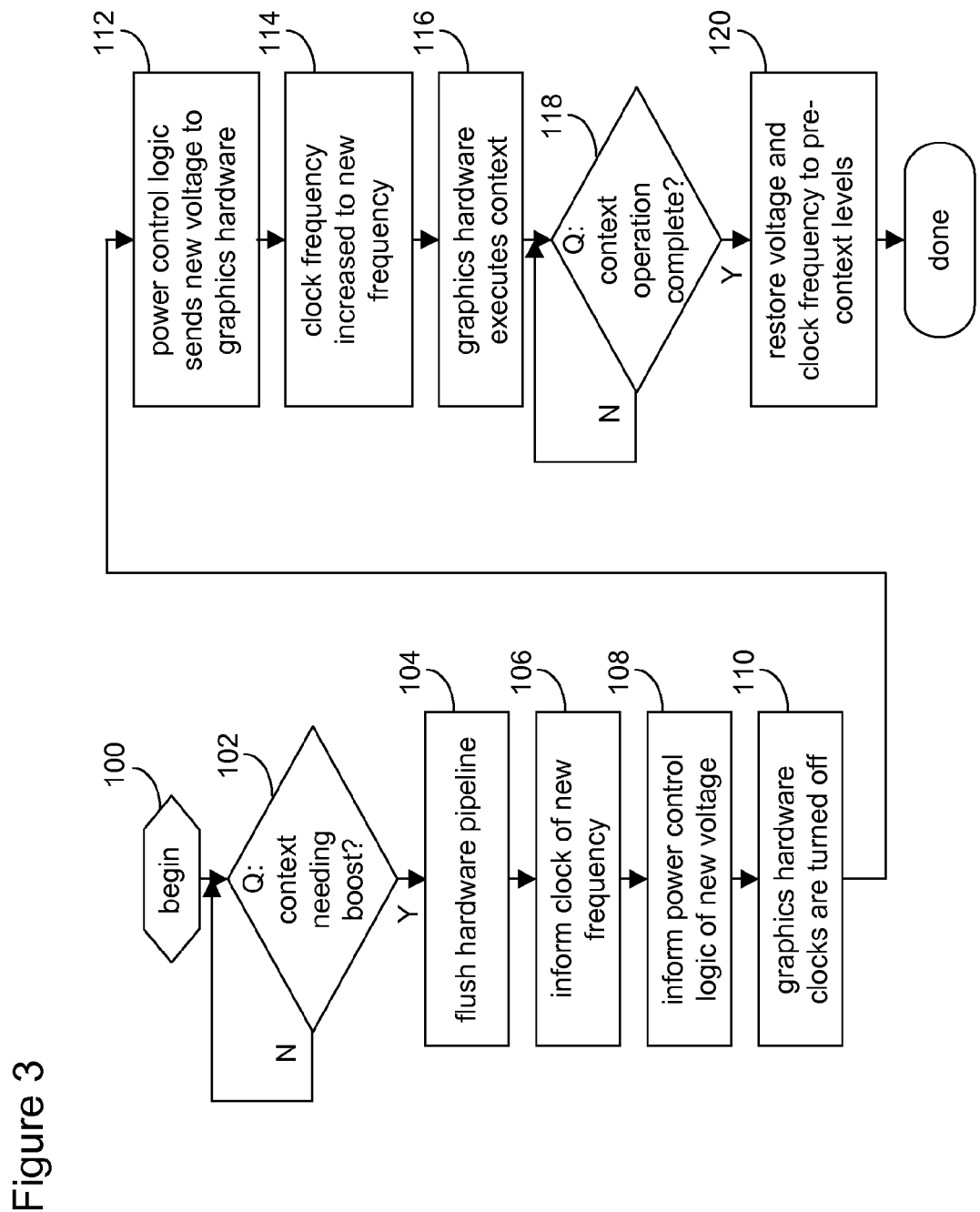
FIG. 3 is a flow diagram showing operation of the graphics system of FIG. 1 to boost the voltage and clock frequency of the graphics hardware, according to some embodiments.

FIG. 3 is a flow diagram showing operation of the graphics system 100 to adjust the voltage 82 and clock frequency 92 of the graphics hardware 60 when appropriate, based on the workload of the system. Once the workload detection software 200 determines that the unexecuted context can be boosted (block 102), a pipeline of the graphics hardware 60 is flushed (block 104). The flush causes all the interfaces to become idle. The work detection software 200 informs the clock 90 of the new frequency (block 106) while the software informs the power control logic 80 of the new voltage (block 108). Although these operations are shown sequentially, they may be performed simultaneously or in reverse order. All clocks 90 of the graphics hardware 60 are turned off (block 110). The voltage 82 to the graphics hardware 60 is increased to the new voltage level by the power control logic 80 (block 112). Likewise, the one or more clocks 90 are increased to the boosted frequency (block 114). At this point, the context can be executed by the graphics hardware 60, with an increase in frequency 92 and voltage 82 (block 116). These new voltage 82 and frequency 92 remain until the context to be boosted has terminated (block 118), at which point the voltage 82 and frequency 92 are restored to their original values (block 120).

In some embodiments, the graphics system 100 enables maximum performance and power. In most current systems, the worst case dissipated power controls the maximum frequency of the system. However, if the current running workload is not the TDP workload, it is possible to boost the frequency 92 and voltage 82 of the graphics hardware 60 within the integrated graphics chipset 50 for better power/performance.

Figure 4:
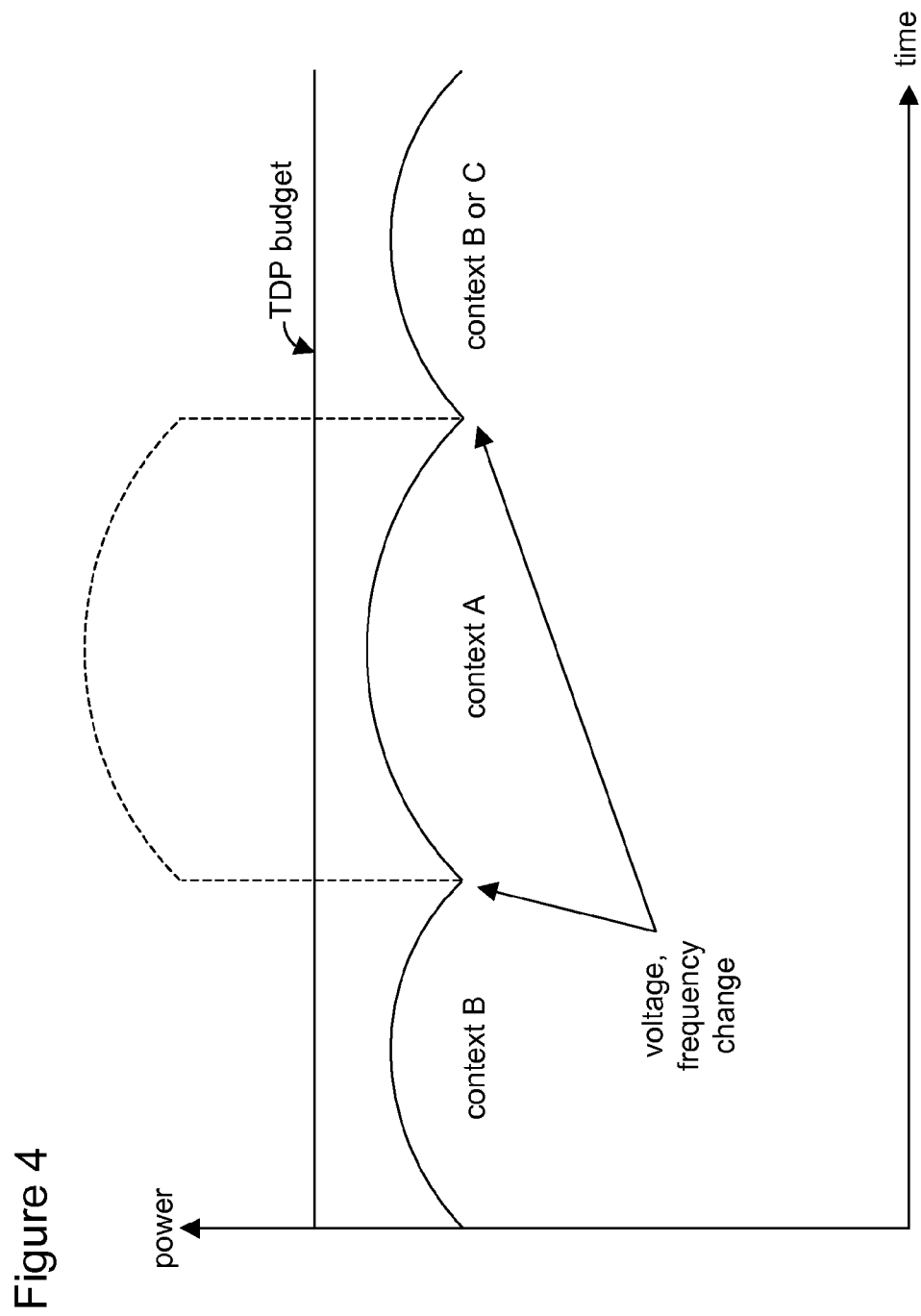
FIG. 4 is a graph showing how the graphics system of FIG. 1 manages contexts with different power needs to maintain a total power budget, according to some embodiments.

FIG. 4 is a diagram showing how the graphics system 100 manages contexts with differing power budgets, and yet operates successfully within a given TDP budget. Context A is a more active context than context B or C. The dotted lines show the power versus time for a prior art graphics system (not graphics system 100). The graphics system 100 establishes a lower voltage and frequency for context A, such that the long-term average power remains within the TDP budget of the chipset 50. Context B, which is a less active context than context A, may operate at a higher voltage and frequency, while not exceeding the TDP budget, and yet achieve a higher performance because the frequency and power of context B is higher than would have been necessary to keep context A below the TDP budget.

In cases where the performance of the mobile part is marginal for media type workloads, the graphics system 100 will allow the graphics hardware 60 to run at a higher frequency. Further, any hardware that has multiple voltage wells can be tailored to implement the ideas of the graphics system 100.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A graphics system, comprising:
graphics hardware in an integrated graphics chipset, wherein the graphics hardware is in a separate voltage well from other logic in the graphics chipset so that a voltage powering the graphics hardware is separately adjustable from a non-graphics hardware voltage powering the other logic;
a clock dedicated to providing a first clock frequency and a second clock frequency to the graphics hardware;
power control logic to supply a first graphics hardware voltage and a second graphics hardware voltage to the graphics hardware, wherein the first graphics hardware voltage and the second graphics hardware voltage are different from the non-graphics hardware voltage power the other logic; and
workload detection software to control whether the first graphics hardware voltage or the second graphics hardware voltage is supplied to the graphics hardware and whether the first clock frequency or the second clock frequency is supplied to the graphics hardware, the voltage and frequency to be based on the current workload on the graphics hardware, the current workload to be identified by a context running on the graphics system, wherein the context is a collection of states managed by the graphics hardware;
wherein the graphics hardware:
executes a first context at the first clock frequency and the first graphics hardware voltage, wherein the first clock frequency is generated by the clock at the behest of the workload detection software and the first graphics hardware voltage is generated by the power control logic at the behest of the workload detection software;
executes a first workload associated with the first context;
executes a second context at the second clock frequency and the second graphics hardware voltage, wherein all states associated with the first context are stored in a memory before the second context is executed; and
executes a second workload associated with the second context;
wherein the voltage and the second graphics hardware voltage are issued by the power control logic at the behest of the workload detection software.

2. The graphics system of claim 1, wherein the memory is inside the integrated graphics chipset.

3. The graphics system of claim 1, wherein the memory is outside the integrated graphics chipset.

4. The graphics system of claim 1, wherein the clock supplies the second clock frequency to the graphics hardware when the power control logic changes the voltage supplied to the graphics hardware.

5. The graphics system of claim 1, wherein the voltage and frequency are restored to an original state when execution of the context by the graphics hardware is terminated.

6. A method comprising:
increasing a clock frequency to a graphics hardware in an integrated graphics chipset at the behest of a workload detection software program, wherein the workload detection software program identifies a workload being submitted to the graphics hardware, the workload being based on a current context, the context comprising a collection of states managed by the graphics hardware;
executing the current context by the graphics hardware, wherein the graphics hardware is powered by a first adjustable voltage executed at a first adjustable clock frequency while other logic the integrated graphics chipset is powered by a second voltage executed at a second clock frequency, wherein the first adjustable voltage, the first adjustable clock frequency, the second voltage, and the second clock frequency are controlled by the workload detection software program;
modifying, by the workload detection software program, the first adjustable voltage delivered to the graphics hardware before executing the context by the graphics hardware, wherein the graphics hardware resides in a voltage well separate from other logic of the integrated graphics chipset;
modifying, by the workload detection software program, the first adjustable clock frequency at which the graphics hardware is executed when the first adjustable voltage is modified to a second adjustable voltage;
executing the context by the graphics hardware;

storing the collection of states associated with the context in a memory;

decreasing, by the workload detection software program, the first adjustable clock frequency to the graphics hardware to an original frequency, wherein the graphics hardware is powered by an original adjustable voltage executed at the original frequency while other logic in the integrated graphics chipset is powered by the second voltage executed at the second clock frequency, the second voltage and the second clock frequency also being controlled by the workload detection software program; and executing a second context by the graphics hardware.

7. The method of claim 6, further comprising:
flushing a hardware pipeline to the graphics hardware.

8. The method of claim 6, further comprising:
turning off the clock frequency to the graphics hardware.

* * * * *

UNITED STATES PATENT AND TRADEMARK OFFICE
CERTIFICATE OF CORRECTION

| | | |
|---|---|---|
| PATENT NO. | : 8,243,085 B2 | Page 1 of 1 |
| APPLICATION NO. | : 11/967207 | |
| DATED | : August 14, 2012 | |
| INVENTOR(S) | : Navale Aditya et al. | |

It is certified that error appears in the above-identified patent and that said Letters Patent is hereby corrected as shown below:

In column 4, line 51, in claim 6, delete "logic" and insert -- logic in --, therefor.

Signed and Sealed this
Eighteenth Day of December, 2012

David J. Kappos
*Director of the United States Patent and Trademark Office*